United States Patent
Nakamura et al.

(10) Patent No.: US 10,861,649 B2
(45) Date of Patent: Dec. 8, 2020

(54) CERAMIC ELECTRONIC COMPONENT AND METHOD OF PRODUCING A CERAMIC ELECTRONIC COMPONENT

(71) Applicant: TAIYO YUDEN CO., LTD., Tokyo (JP)

(72) Inventors: Tomoaki Nakamura, Tokyo (JP); Mikio Tahara, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 92 days.

(21) Appl. No.: 16/032,579

(22) Filed: Jul. 11, 2018

(65) Prior Publication Data

US 2019/0031565 A1    Jan. 31, 2019

(30) Foreign Application Priority Data

Jul. 25, 2017    (JP) .................................. 2017-143224

(51) Int. Cl.
*H01G 4/232*    (2006.01)
*H01G 4/30*    (2006.01)
*C04B 35/16*    (2006.01)
*C01B 33/20*    (2006.01)

(52) U.S. Cl.
CPC ............ *H01G 4/2325* (2013.01); *C01B 33/20* (2013.01); *C04B 35/16* (2013.01); *H01G 4/30* (2013.01); *C04B 2235/3215* (2013.01); *C04B 2235/3284* (2013.01); *C04B 2235/6588* (2013.01); *C04B 2235/78* (2013.01); *C04B 2235/786* (2013.01)

(58) Field of Classification Search
CPC ................... H01G 4/2325; H01G 4/30; C04B 2235/3284; C04B 2235/6588; C04B 2235/78; C04B 2235/3215; C04B 2235/786; C04B 35/16
See application file for complete search history.

(56) References Cited

U.S. PATENT DOCUMENTS

| | | | | |
|---|---|---|---|---|
| 5,536,293 | A * | 7/1996 | Yamamoto | C03C 8/18 204/292 |
| 5,781,402 | A * | 7/1998 | Fujiyama | B22F 1/0007 361/305 |
| 7,074,349 | B2 * | 7/2006 | Konno | H01G 4/2325 252/512 |
| 2005/0219789 | A1 * | 10/2005 | Akimoto | H01C 1/148 361/306.1 |
| 2007/0193675 | A1 * | 8/2007 | Gurav | H01G 4/0085 156/89.12 |
| 2008/0253060 | A1 * | 10/2008 | Ito | H01G 4/1227 361/321.4 |

(Continued)

FOREIGN PATENT DOCUMENTS

EP    1043739 A1 * 10/2000    ........... H01G 4/1227
JP    10-012481 A    1/1998

(Continued)

*Primary Examiner* — David M Sinclair
(74) *Attorney, Agent, or Firm* — Saliwanchik, Lloyd & Eisenschenk

(57) ABSTRACT

A ceramic electronic component includes: a ceramic body that includes internal electrodes; and an external electrode that includes a plurality of crystal particles containing Ba, Zn, Si, and O, the external electrode being formed on a surface of the ceramic body and connected to the internal electrodes.

7 Claims, 8 Drawing Sheets

(56) References Cited

U.S. PATENT DOCUMENTS

| | | | | |
|---|---|---|---|---|
| 2012/0057272 A1* | 3/2012 | Hirata | ................... | H01G 4/008 361/321.4 |
| 2012/0067415 A1* | 3/2012 | Tachizono | ................ | C03C 8/18 136/256 |
| 2014/0347783 A1* | 11/2014 | Kisumi | .................. | H01G 4/012 361/301.4 |
| 2017/0018359 A1* | 1/2017 | Kimura | ................ | H01G 13/006 |
| 2018/0301280 A1* | 10/2018 | Nishisaka | ................. | H01B 1/16 |

FOREIGN PATENT DOCUMENTS

| | | | | |
|---|---|---|---|---|
| JP | 2002100526 A | * | 4/2002 | ............... C03C 8/18 |
| JP | 2003077336 A | * | 3/2003 | |
| JP | 2006-310761 A | | 11/2006 | |
| JP | 2006-344820 A | | 12/2006 | |

* cited by examiner

CERAMIC ELECTRONIC COMPONENT AND METHOD OF PRODUCING A CERAMIC ELECTRONIC COMPONENT

CROSS-REFERENCE TO RELATED APPLICATION

This application claims the benefit under 35 U.S.C. § 119 of Japanese Patent Application No. 2017-143224, filed Jul. 25, 2017, which is hereby incorporated herein by reference in its entirety.

BACKGROUND

The present disclosure relates to a ceramic electronic component such as a multi-layer ceramic capacitor, and a method of producing the ceramic electronic component.

A multi-layer ceramic capacitor includes a ceramic body, in which a plurality of internal electrodes are disposed, and external electrodes that are formed on the surface of the ceramic body and connected to the internal electrodes. For example, the external electrodes are formed by applying an electrically conductive paste containing metal powder, glass frit, and the like to the surface of the ceramic body and performing baking thereon. The glass component is contained from a viewpoint of bondability of the external electrodes and the ceramic body, and the like.

When the electrically conductive paste is baked to form the external electrodes, the glass component contained in the electrically conductive paste is melted, and external electrodes adjacently disposed are fused to each other in some cases. Further, in order to suppress the fusing, decreasing a baking temperature is also conceivable, but there are concerns about reduction in reliability due to reduction in degree of compactness of the external electrodes.

There is known the following technique to inhibit such a phenomenon from occurring.

For example, Japanese Patent Application Laid-open No. Hei 10-12481 (hereinafter, referred to as Patent Document 1) discloses a method of producing a ceramic electronic component, in which a metal additive having a melting point higher than that of metal powder that may be a main component is added to an electrically conductive paste, and then baking is performed thereon.

Japanese Patent Application Laid-open No. 2006-344820 (hereinafter, referred to as Patent Document 2) discloses a method of producing a ceramic electronic component, in which a paste for external electrodes is applied and then baked with metal powder adhering thereto.

Japanese Patent Application Laid-open No. 2006-310761 (hereinafter, referred to as Patent Document 3) discloses a method of producing a ceramic electronic component, in which a tray for chip-shaped electronic components, on which chips are to be disposed while inhibiting the fusing from occurring at the time of baking of external electrodes, is used.

SUMMARY

However, in the production methods disclosed in Patent Documents 1 and 2, it has been necessary to add the metal additive or metal powder to the electrically conductive paste.

Further, in the production method disclosed in Patent Document 3, it has been necessary to use the tray for chip-shaped electronic components, on which chips are to be disposed.

In such a manner, the solving methods disclosed in Patent Documents 1 to 3 have had the problems of increase in costs and man-hours.

In view of the circumstances as described above, it is desirable to provide a ceramic electronic component capable of easily inhibiting fusing from occurring between components at the time of baking of external electrodes, and a method of producing the ceramic electronic component.

According to an embodiment of the present disclosure, there is provided a ceramic electronic component including a ceramic body and an external electrode.

The ceramic body includes internal electrodes.

The external electrode includes a plurality of crystal particles containing barium (Ba), zinc (Zn), silicon (Si), and oxygen (O), the external electrode being formed on a surface of the ceramic body and connected to the internal electrodes.

The plurality of crystal particles may include a rod-like crystal particle.

In the configuration described above, the plurality of crystal particles containing Ba, Zn, Si, and O are deposited on the external electrode, and thus deposition of glass on the external electrode can be suppressed. This can easily inhibit fusing from occurring between the components due to melting of the glass.

If the external electrode is divided into a surface region within a half depth of a thickness of the external electrode from a surface of the external electrode, and an internal region adjacent between the surface region and the ceramic body, the plurality of crystal particles may be more distributed in the surface region than in the internal region.

With this configuration, the crystal particles are deposited at lot on the surface side of the external electrode, and thus deposition of glass from that surface can be suppressed. Therefore, it is possible to effectively inhibit fusing from occurring between the components due to melting of the glass.

For example, each of the plurality of crystal particles may have a length of 20 μm or less in a longitudinal direction.

For example, the external electrode may include copper.

According to another embodiment of the present disclosure, there is provided a method of producing a ceramic electronic component, the method including: forming a ceramic body including internal electrodes; applying an electrode material containing barium (Ba), zinc (Zn), and silicon (Si) to a surface of the ceramic body; and depositing crystal particles containing Ba, Zn, Si, and oxygen (O) by baking the electrode material under a humidified atmosphere, and forming an external electrode that is connected to the internal electrodes.

In the configuration described above, since the electrode material containing barium (Ba), zinc (Zn), and silicon (Si) is baked under the humidified atmosphere, crystal particles containing Ba, Zn, Si, and oxygen (O) are deposited at the time of baking. Accordingly, since part of glass components of the electrode material is taken in by the crystal particles, deposition of glass on the external electrode at the time of baking can be suppressed. Therefore, it is possible to easily inhibit fusing from occurring between the components due to melting of the glass.

The electrode material may include flaky metal powder. Accordingly, more crystal particles can be deposited.

Further, the electrode material may include copper.

As described above, according to the embodiments of the present disclosure, it is possible to provide a ceramic electronic component capable of easily inhibiting fusing from occurring between components at the time of baking of external electrodes, and a method of producing the ceramic electronic component.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Configuration of Multi-Layer Ceramic Capacitor 10

Figure 1:
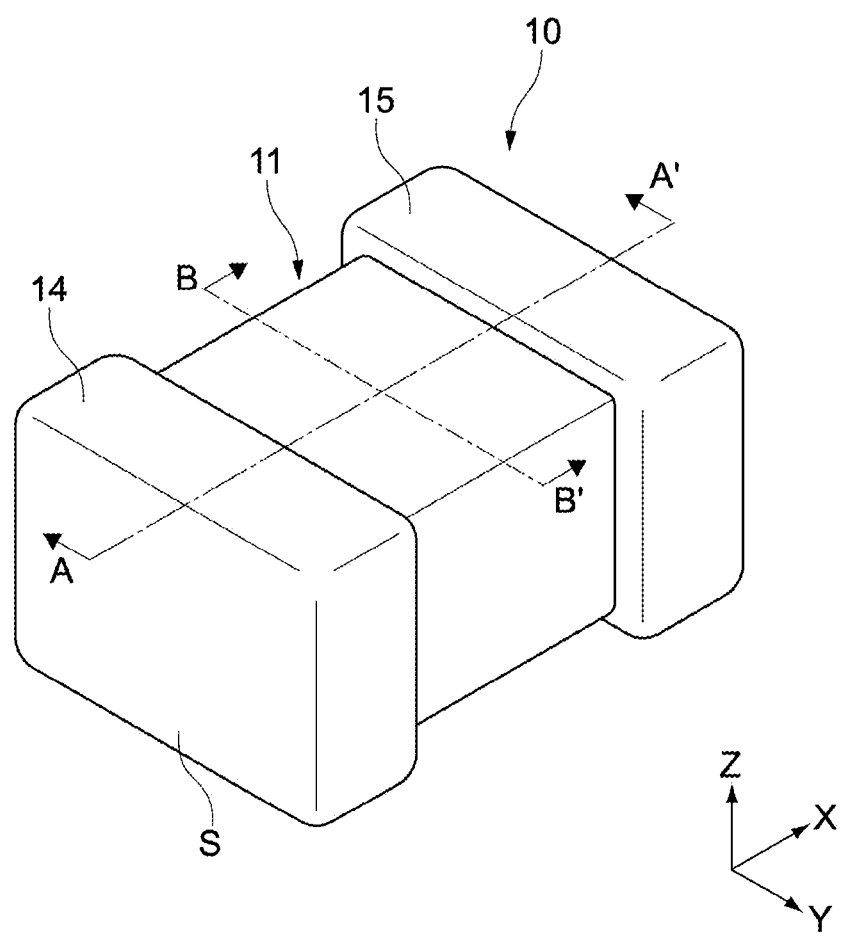
FIG. 1 is a perspective view of a multi-layer ceramic capacitor according to an embodiment of the present disclosure.
Figure 2:
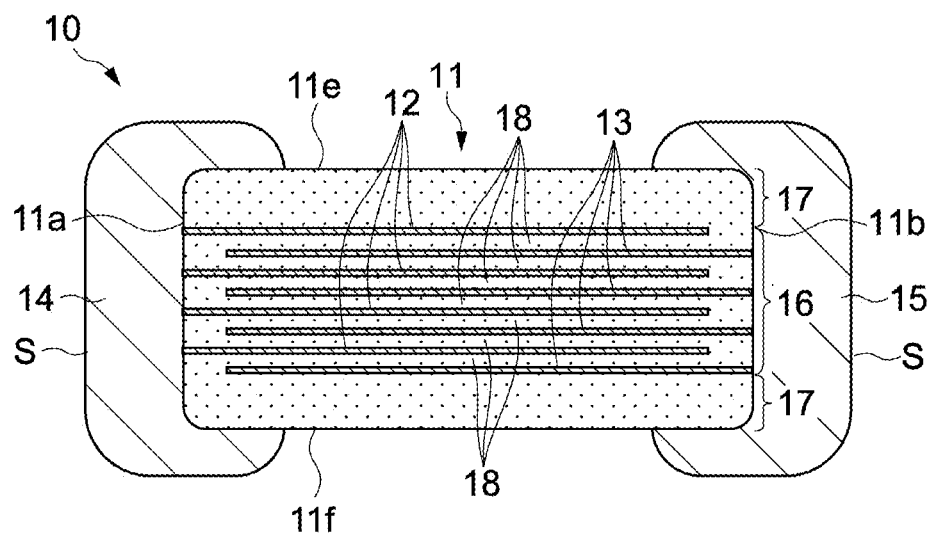
FIG. 2 is a cross-sectional view of the multi-layer ceramic capacitor taken along the A-A' line in FIG. 1.
Figure 3:
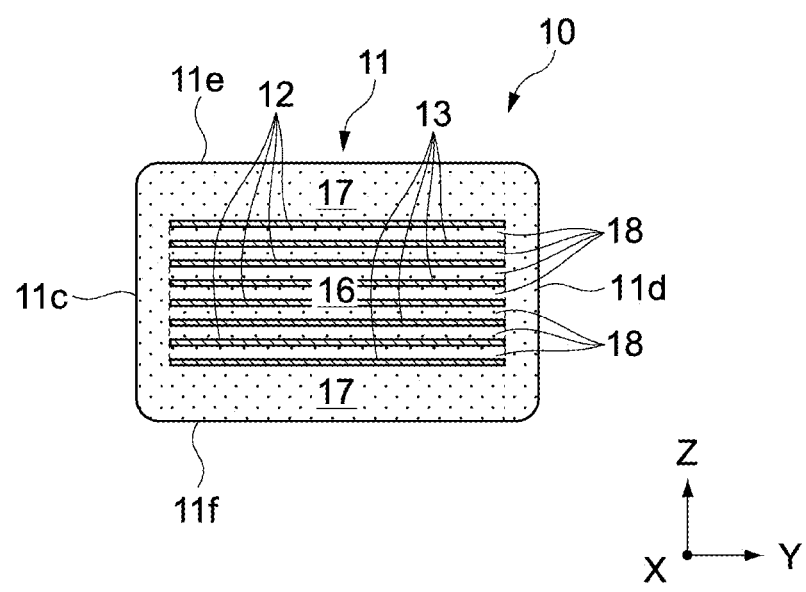
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. The multi-layer ceramic capacitor 10 has a configuration in which the first external electrode 14 and the second external electrode 15 are formed on the surface of the ceramic body 11.

Typically, the ceramic body 11 has two end surfaces 11a and 11b facing in an X-axis direction, two side surfaces 11c and 11d facing in a Y-axis direction, and two main surfaces 11e and 11f facing in a Z-axis direction. The first external electrode 14 and the second external electrode 15 are formed on the end surfaces 11a and 11b, respectively. Ridges connecting the respective surfaces of the ceramic body 11 may be chamfered.

It should be noted that the ceramic body 11 does not need to have the rectangular shape as shown in FIGS. 1 to 3. For example, the surfaces of the ceramic body 11 may be curved surfaces, and the ceramic body 11 may be rounded as a whole.

The ceramic body 11 includes a capacitance forming unit 16 and protective portions 17. The capacitance forming unit 16 includes a plurality of ceramic layers 18, a plurality of first internal electrodes 12, and a plurality of second internal electrodes 13, thus having a laminated configuration of those layers and electrodes. The protective portions 17 cover the entire main surfaces of the capacitance forming unit 16 and the entire side surfaces thereof, the main surfaces facing in the Z-axis direction, the side surfaces facing in the Y-axis direction.

The first internal electrodes 12 and the second internal electrodes 13 are alternately disposed along the Z-axis direction between the ceramic layers 18 laminated in the Z-axis direction. The first internal electrodes 12 are drawn to the end surface 11a and apart from the end surface 11b. The second internal electrodes 13 are drawn to the end surface 11b and apart from the end surface 11a.

Typically, the first and second internal electrodes 12 and 13 mainly contain nickel (Ni) and function as internal electrodes of the multi-layer ceramic capacitor 10. It should be noted that the first and second internal electrodes 12 and 13 may contain at least one of copper (Cu), silver (Ag), and palladium (Pd) as a main component, other than nickel.

The ceramic layers 18 are formed of dielectric ceramics. In order to increase the capacitance of the capacitance forming unit 16, the ceramic layers 18 are formed of dielectric ceramics having a high dielectric constant.

For the dielectric ceramics having a high dielectric constant, polycrystal of a barium titanate ($BaTiO_3$) based material, i.e., polycrystal having a Perovskite structure containing barium (Ba) and titanium (Ti) is used. This provides the multi-layer ceramic capacitor 10 with a large capacitance.

It should be noted that the ceramic layers 18 may be formed of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The protective portions 17 are also formed of dielectric ceramics. The material of the protective portions 17 only needs to be insulating ceramics, but use of dielectric ceramics similar to the dielectric ceramics of the ceramic layers 18 leads to suppression of internal stress in the ceramic body 11.

The protective portions 17 cover the surfaces of the capacitance forming unit 16 other than both the end surfaces facing in the X-axis direction. The protective portions 17 have the main functions of protecting the periphery of the capacitance forming unit 16 and ensuring insulation properties of the first and second internal electrodes 12 and 13.

Hereinafter, regions of the protective portions 17 on the main surfaces 11e and 11f side are referred to as cover regions, and regions of the protective portions 17 on the side surfaces 11c and 11d side are referred to as side margin regions.

The first external electrode 14 and the second external electrode 15 are formed on the end surfaces 11a and 11b of the ceramic body 11, respectively. The first external electrode 14 is connected to the first internal electrodes 12, which are drawn to the end surface 11a. The second external electrode 15 is connected to the second internal electrodes 13, which are drawn to the end surface 11b.

The first external electrode 14 and the second external electrode 15 may cover the end surfaces 11a and 11b, respectively, and also extend to both the side surfaces 11c and 11d and both the main surfaces 11e and 11f. In this case, in either one of the first external electrode 14 and the second external electrode 15, a cross section parallel to an X-Z plane and a cross section parallel to an X-Y plane have a U-shape.

The first external electrode 14 and the second external electrode 15 are formed as sintered metal films, which are formed by baking an electrode material such as an electrically conductive paste. One or more plating films may be formed on a surface S of each of the first external electrode 14 and the second external electrode 15 (not shown). This facilitates mounting of the multi-layer ceramic capacitor 10 by solder or the like.

2. Detailed Configuration of First External Electrode 14 and Second External Electrode 15

Figure 4:
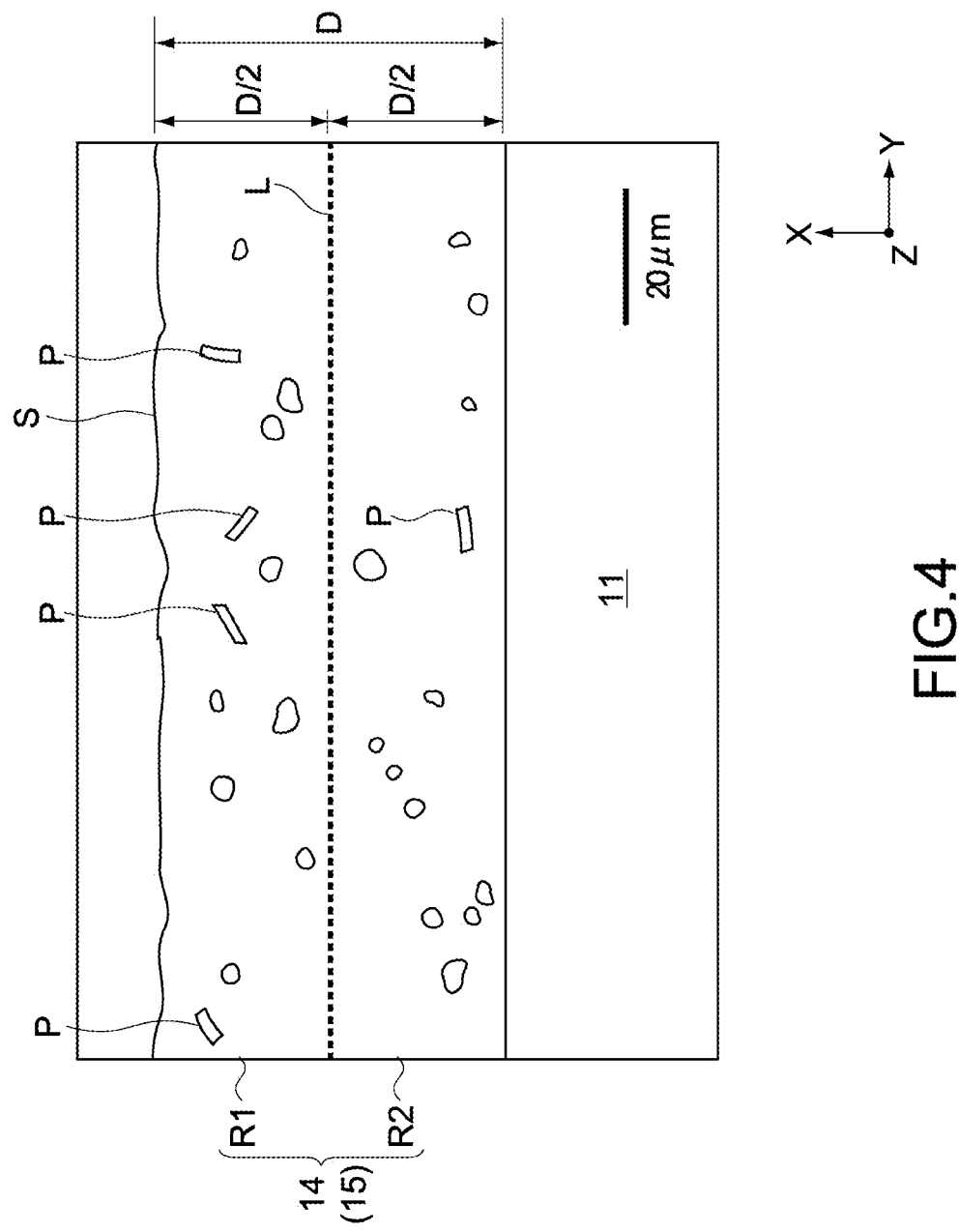
FIG. 4 is an enlarged cross-sectional view of an external electrode of the multi-layer ceramic capacitor.
Figure 5:
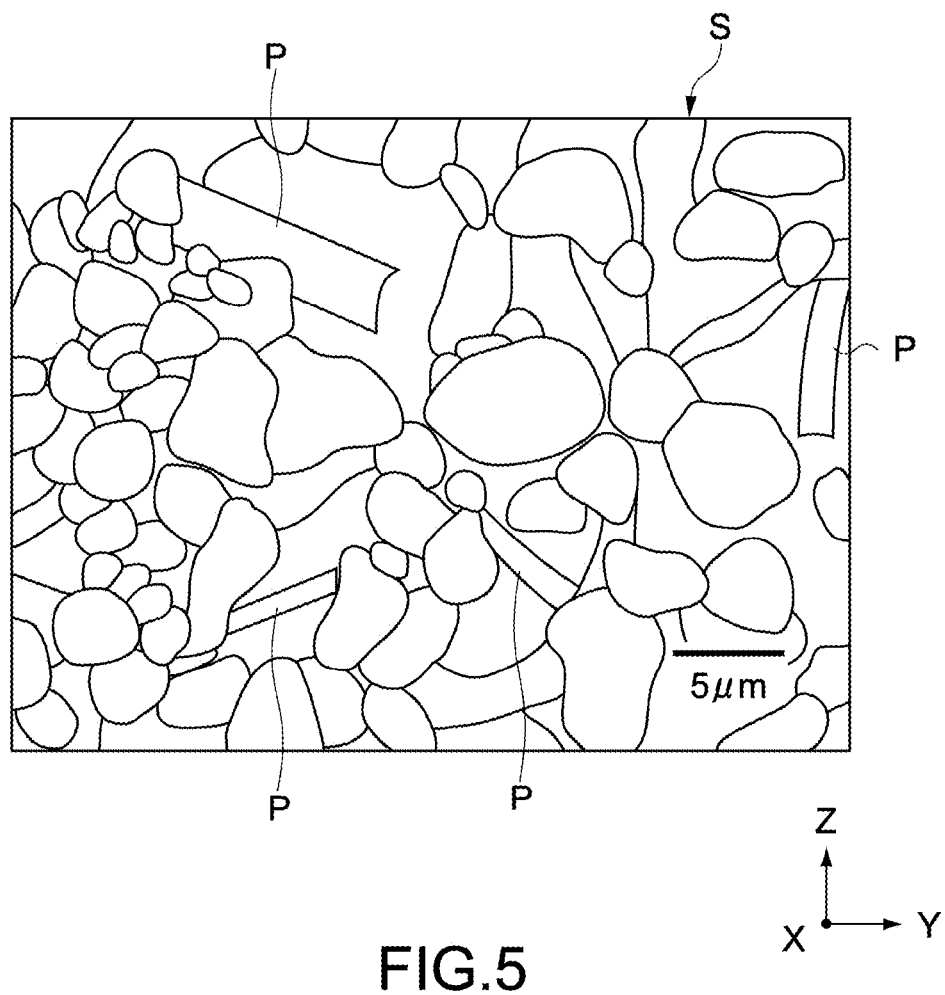
FIG. 5 is an enlarged plan view of the surface of the external electrode of the multi-layer ceramic capacitor.

FIG. 4 is an enlarged cross-sectional view of each of the first and second external electrodes 14 and 15 when viewed from the Z-axis direction. FIG. 5 is an enlarged plan view of the surface S of each of the first and second external electrodes 14 and 15.

The first external electrode 14 and the second external electrode 15 each include a plurality of rod-like crystal particles P containing barium (Ba), zinc (Zn), silicon (Si), and oxygen (O). As will be described later, the rod-like crystal particles P are crystal particles having a longitudinal direction, which are to be deposited at the time of baking of the first and second external electrodes 14 and 15. The rod-like crystal particles P are formed to be, for example, rectangular in planar view, but the rod-like crystal particles P are not limited thereto as long as they are formed to be long in one direction. For example, each of the rod-like crystal particles P may have the length of 0.3 μm or more and 20 μm or less in the longitudinal direction and the length of 0.1 μm or more and 3 μm or less in the lateral direction. The rod-like crystal particles P are formed of, for example, barium zinc silicate ($BaZnSiO_4$).

Assuming that each of the first and second external electrodes 14 and 15 is divided into a surface region R1 within a half depth D/2 of a thickness D of each of the first and second external electrodes 14 and 15 from the surface S thereof, and an internal region R2 adjacent between the surface region R1 and the ceramic body 11, the rod-like crystal particles P are more distributed in the surface region R1 than in the internal region R2. In the example of FIG. 4, four rod-like crystal particles P are distributed in the surface region R1, and one rod-like crystal particle P is distributed in the internal region R2. Further, as shown in FIG. 5, the rod-like crystal particles P are also deposited a lot on the surface S.

Referring to FIG. 4, the surface region R1 and the internal region R2 can also be defined as follows.

In a cross section of each of the first and second external electrodes 14 and 15 when viewed from a direction (e.g., Z-axis direction) orthogonal to a thickness direction of the first and second external electrodes 14 and 15 (e.g., X-axis direction), the surface region R1 refers to a region on the surface S side of each of the first and second external electrodes 14 and 15 relative to a virtual center line L extending along the center in the thickness direction of each of the first and second external electrodes 14 and 15.

The internal region R2 refers to, in the above-mentioned cross section of each of the first and second external electrodes 14 and 15, a region on the ceramic body 11 side of each of the first and second external electrodes 14 and 15 relative to the virtual center line L.

Since the first and second external electrodes 14 and 15 include the rod-like crystal particles P, as will be described later, the multi-layer ceramic capacitors 10 adjacent to each other can be inhibited from being fused to each other at the time of baking of the first and second external electrodes 14 and 15.

3. Method of Producing Multi-Layer Ceramic Capacitor 10

Figure 6:
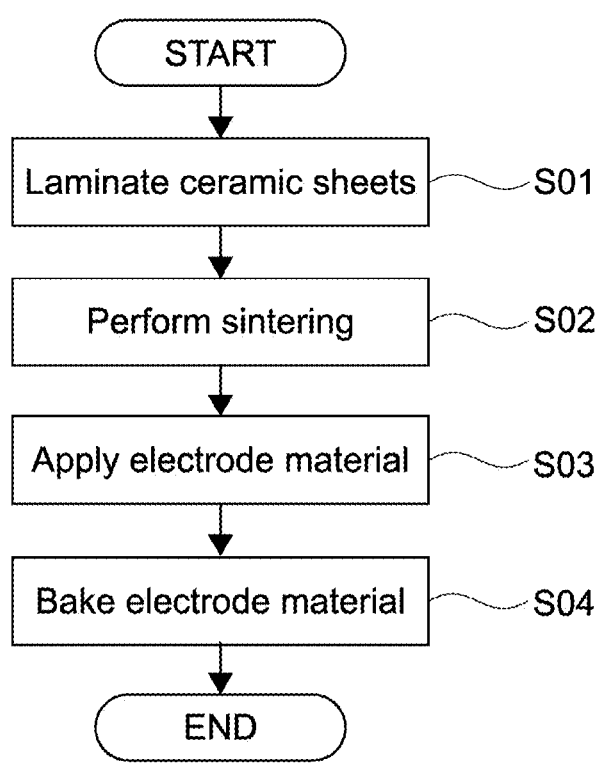
FIG. 6 is a flowchart showing a method of producing the multi-layer ceramic capacitor.
Figure 7:
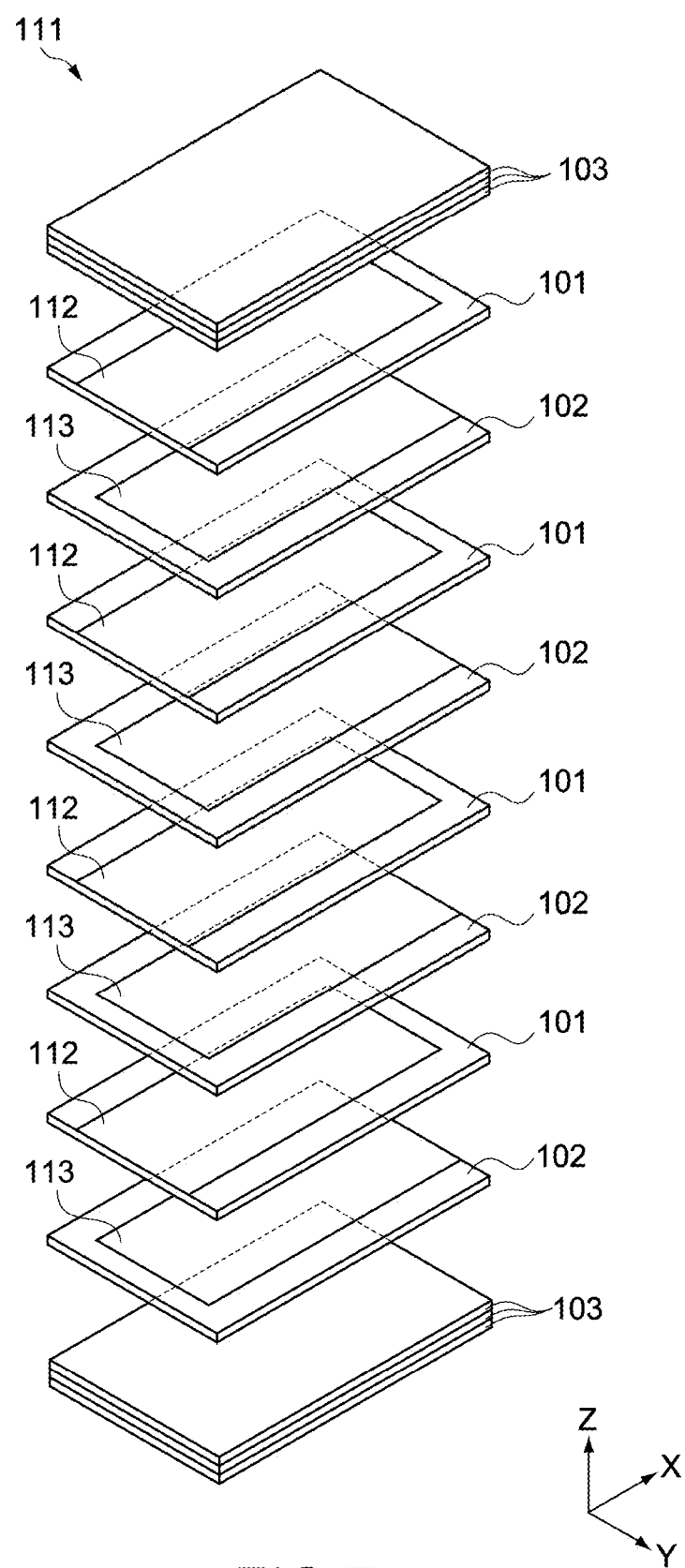
FIG. 7 is an exploded perspective view showing a production process of the multi-layer ceramic capacitor.
Figure 8:
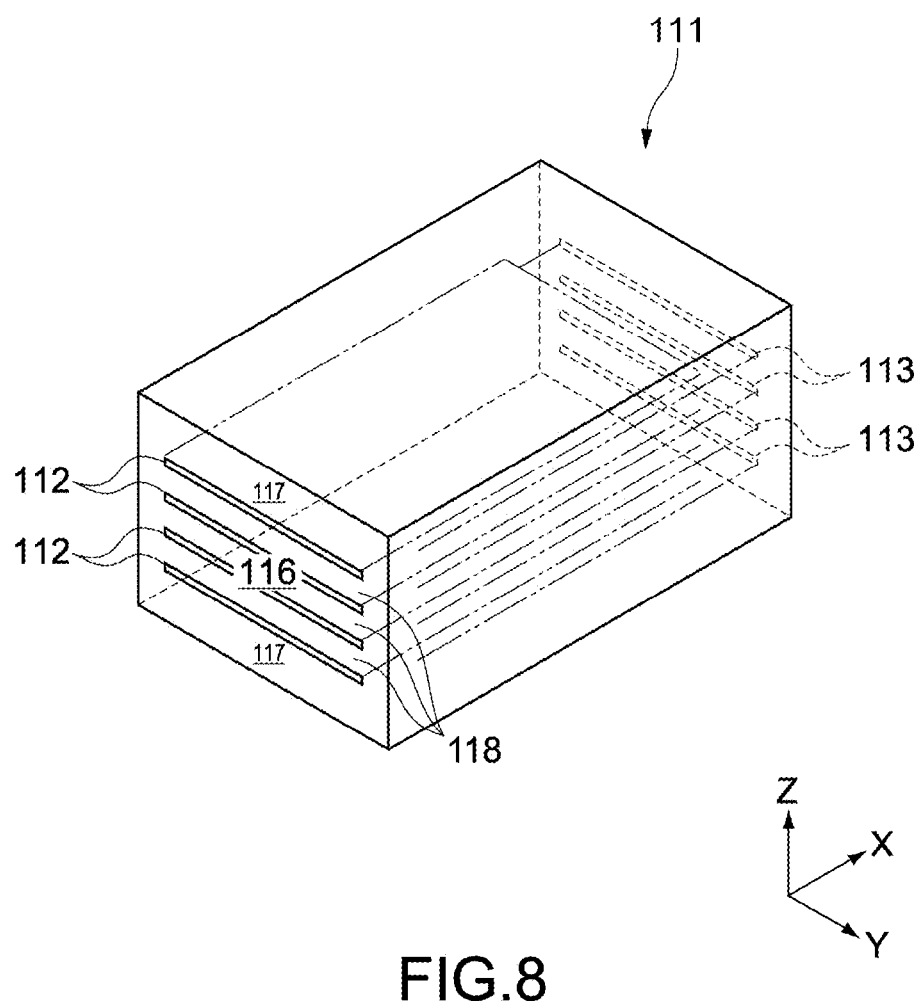
FIG. 8 is a perspective view showing a production process of the multi-layer ceramic capacitor.

FIG. 6 is a flowchart showing a method of producing the multi-layer ceramic capacitor 10. FIGS. 7 and 8 are views each showing a production process of the multi-layer ceramic capacitor 10. Hereinafter, the method of producing the multi-layer ceramic capacitor 10 will be described along FIG. 6 with reference to FIGS. 7 and 8 as appropriate.

3.1 Step S01: Lamination of Ceramic Sheets

In Step S01, first ceramic sheets 101 and second ceramic sheets 102 for forming the capacitance forming unit 16, and third ceramic sheets 103 for forming the cover regions of the protective portions 17 are prepared. As shown in FIG. 7, those first, second, and third ceramic sheets 101, 102, and 103 are laminated to produce an unsintered ceramic body 111.

The first, second, and third ceramic sheets 101, 102, and 103 are configured as unsintered dielectric green sheets mainly containing dielectric ceramics. The first, second, and third ceramic sheets 101, 102, and 103 are formed into a sheet shape by using a roll coater or a doctor blade, for example. The thickness of the first, second, and third ceramic sheets 101, 102, and 103 is adjustable as appropriate.

As shown in FIG. 7, unsintered first internal electrodes 112 corresponding to the first internal electrodes 12 are formed on the first ceramic sheets 101, and unsintered second internal electrodes 113 corresponding to the second internal electrodes 13 are formed on the second ceramic sheets 102. It should be noted that no internal electrodes are formed on the third ceramic sheets 103 corresponding to the cover regions of the protective portions 17.

The unsintered first and second internal electrodes 112 and 113 can be formed by applying any electrically conductive paste to the first and second ceramic sheets 101 and 102. A method of applying the electrically conductive paste can be arbitrarily selected from well-known techniques. For example, for the application of the electrically conductive paste, a screen printing method or a gravure printing method can be used.

In the unsintered ceramic body 111 shown in FIG. 7, the first and second ceramic sheets 101 and 102 are alternately laminated. On the upper and lower surfaces of the laminate in the Z-axis direction, the third ceramic sheets 103 corresponding to the cover regions are laminated. It should be noted that the number of first, second, and third ceramic sheets 101, 102, and 103 is not limited to the number shown in the example of FIG. 7.

The unsintered ceramic body 111 is integrated by pressure-bonding of the first, second, and third ceramic sheets 101, 102, and 103. For the pressure-bonding of the first, second, and third ceramic sheets 101, 102, and 103, for example, hydrostatic pressing or uniaxial pressing is desirably used. With this configuration, a high-density ceramic body 111 can be obtained.

FIG. 8 is a perspective view of the unsintered ceramic body 111 obtained in Step S01. The unsintered ceramic body 111 includes a capacitance forming unit 116 in which the first and second internal electrodes 112 and 113 are alternately laminated between ceramic layers 118 and are exposed to both the end surfaces facing in the X-axis direction. The unsintered ceramic body 111 includes protective portions 117 in the periphery of the capacitance forming unit 116, in which the first and second internal electrodes 112 and 113 are not exposed from both the side surfaces facing in the Y-axis direction and both the main surfaces facing in the Z-axis direction.

It should be noted that the unsintered ceramic body 111 corresponding to the single ceramic body 11 has been described above, but actually, a laminated sheet, which is a large-sized sheet and is not singulated, is formed and then singulated into the ceramic bodies 111.

3.2 Step S02: Sintering

In Step S02, the unsintered ceramic body 111 obtained in Step S01 is sintered, to produce the ceramic body 11 shown in FIGS. 1 to 3. In other words, in Step S02, the capacitance forming unit 116 becomes the capacitance forming unit 16, and the protective portions 117 become the protective portions 17.

A sintering temperature in Step S02 can be determined on the basis of a sintering temperature for the ceramic body 111. For example, when a barium titanate based material is used as the dielectric ceramics, the sintering temperature can be set to approximately 1,000 to 1,300° C. Further, sintering can be performed in a reduction atmosphere or a low-oxygen partial pressure atmosphere, for example.

3.3 Step S03: Application of Electrode Material

In Step S03, an electrode material is applied to the surfaces of the ceramic body 11 obtained in Step S02.

For example, an unsintered electrode material is applied to both the end surfaces 11a and 11b of the ceramic body 11. Examples of the electrode material include an electrically conductive paste containing metal powder, barium (Ba), zinc (Zn), and silicon (Si). The metal powder may contain copper (Cu), nickel (Ni), silver (Ag), palladium (Pd), or the like, and may be formed of Cu, for example. Si, Ba, and Zn are added as glass components. The electrode material may contain, in addition to those above, an organic binder or the like as appropriate.

In this embodiment, the electrode material may contain flaky metal powder. The flaky metal powder refers to metal powder including thin scale-like particles, in each of which, for example, the aspect ratio of the length in the longitudinal direction to the thickness is equal to or more than tenfold, the length in the longitudinal direction is 5 μm or more, and the thickness is 1 μm or less. The flaky metal powder is formed by, for example, extending and processing metal powder including sphere-shaped particles to be thinner. The electrode material contains the flaky metal powder, and thus more rod-like crystal particles P can be deposited.

The percentage of the flaky metal powder in the whole metal powder can be set to, for example, 60% or more and 95% or less. With this configuration, many rod-like crystal particles P can be deposited, and the density of the electrodes after the baking can also be sufficiently increased.

For an application method, a dip method can be used. Thus, the electrode material can be applied so as to cover both the end surfaces 11a and 11b. Alternatively, a screen printing method or a roll transfer method may be used.

3.4 Step S04: Baking of Electrode Material

In Step S04, the applied electrode material is baked. Thus, the rod-like crystal particles containing barium (Ba), zinc (Zn), silicon (Si), and oxygen (O) are deposited, and the first external electrode 14 and the second external electrode 15 that are connected to the first internal electrodes 12 and the second internal electrodes 13, respectively, are formed.

The electrode material is to be baked in a humidified atmosphere. The humidified atmosphere refers to, for example, an atmosphere where a reduction atmosphere or a low-oxygen partial pressure atmosphere is provided with moisture and humidified. This enables more rod-like crystal particles P to be deposited on the first and second external electrodes 14 and 15. A dew-point temperature in this atmosphere only needs to be, for example, 20° C. or more and 60° C. or less, more desirably, 30° C. or more and 50° C. or less.

Furthermore, plating such as electrolytic plating may be performed on the first external electrode 14 and the second external electrode 15, to form one or a plurality of plating films thereon.

It should be noted that the above treatment in Step S03 may be performed before Step S02. For example, before Step S02, an unsintered electrode material may be applied to both end surfaces of the unsintered ceramic body 111 in the X-axis direction. Thus, in Step S02, sintering of the unsintered ceramic body 111 and baking of the electrode material can be simultaneously performed.

4. Actions and Effects

In the multi-layer ceramic capacitor 10 of this embodiment, the electrode material containing barium (Ba), zinc (Zn), and silicon (Si) is baked under the humidified atmosphere, and thus the rod-like crystal particles P containing Ba, Zn, Si, and oxygen (O) can be deposited. This can inhibit the multi-layer ceramic capacitors 10 from being fused to each other due to melting of the glass at the time of baking.

It is presumed that the rod-like crystal particles P are formed in the following mechanism.

At the time of baking of the electrode material, as the temperature increases, the glass components of silicon (Si), zinc (Zn), barium (Ba), and the like are melted, and liquid-phase sintering occurs. At the same time, a seed crystal of the rod-like crystal particles P dominated by the element of Zn or the like is formed, and the crystal grows while taking in part of the glass components, so that the rod-like crystal particles P are formed. Furthermore, it is thought that by baking under the humidified atmosphere, the presence of water vapor suppresses vaporization of the elements contained in the rod-like crystal particle P, and deposition of the rod-like crystal particles P can be promoted.

According to the mechanism described above, since part of the glass components is taken in by the rod-like crystal particles P, the rod-like crystal particles P are deposited, and the deposition of glass is suppressed. Thus, the multi-layer ceramic capacitors 10 can be inhibited from being fused to each other due to the melting of the glass.

Furthermore, as shown in FIGS. 4 and 5, the rod-like crystal particles P can be distributed a lot in the surface region R1 of each of the first and second external electrodes 14 and 15. This can suppress the deposition of the glass on the surface S and can effectively inhibit the multi-layer ceramic capacitors 10 from being fused to each other due to the melting of the glass.

Meanwhile, in the internal region R2 of each of the first and second external electrodes 14 and 15, the glass can be sufficiently deposited while suppressing the deposition of the rod-like crystal particles P. Thus, adhesion of the ceramic body 11 and the first and second external electrodes 14 and 15, which is the original function of the glass, can be sufficiently ensured.

Further, it is known that if the glass is deposited a lot on the surface S, continuity when plating films are formed on the surface S is reduced. In this regard, according to this embodiment, continuity of the plating films formed on the surface S can be improved.

Further, according to the production method of this embodiment, fusing between the components can be inhibited from occurring, and thus the multi-layer ceramic capacitors 10 can be densely arranged and then subjected to baking. This can increase the number of multi-layer ceramic capacitors 10 that can be treated at one time and also improve productivity.

Furthermore, by using the electrode material containing the flaky metal powder, the rod-like crystal particles can be deposited more easily. Actually, in the case of baking an electrode material containing flaky copper powder whose particles have a diameter of 7 to 8 µm and copper powder whose sphere-shaped particles have a diameter of 1 µm at the percentage of 95:5 to 60:40, more rod-like crystal particles were deposited than in the case of using an electrode material containing fine copper powder whose particles have a diameter of 0.5 µm. Further, the electrode material containing the flaky copper powder had a larger size of the rod-like crystal particles. With this configuration, using the electrode material containing the flaky metal powder can effectively inhibit the multi-layer ceramic capacitors 10 from being fused to each other.

5. Examples and Comparative Example

As Examples and Comparative example of this embodiment, samples of the multi-layer ceramic capacitor 10 were produced on the basis of the production method described above, and an atmosphere of baking of the external electrodes, the presence or absence of deposition of the rod-like crystal particles, the degree of fusing between the components, and the like were investigated.

Table 1 shows the production method and evaluation results of Examples and Comparative example according to this embodiment.

In the samples of each of the Examples 1, 2, and 3 and the Comparative example, an electrode material containing barium (Ba), zinc (Zn), silicon (Si), and copper powder was applied to the end surfaces 11a and 11b of the ceramic body 11 by a dip method and then baked. In the Examples 1 to 3, the atmosphere of the baking was an atmosphere where nitrogen gas is provided with moisture and then humidified (humidification: applied), and in the Comparative example, the atmosphere of the baking was an atmosphere where nitrogen gas is not provided with moisture (humidification: not applied). Dew-point temperatures of the samples of the Examples 1 to 3 are as shown in the table. Further, in each of the Examples 1 to 3 and the Comparative example, baking was performed in a state where the 2,000 samples were densely arranged.

TABLE 1

|  | Example 1 | Example 2 | Example 3 | Comparative Example |
| --- | --- | --- | --- | --- |
| Humidification | Applied | Applied | Applied | Not applied |
| Dew-point temperature | 26° C. | 36° C. | 46° C. | — |
| Rod-like crystal | Present | Present | Present | Absent |

TABLE 1-continued

|  | Example 1 | Example 2 | Example 3 | Comparative Example |
| --- | --- | --- | --- | --- |
| particles |  |  |  |  |
| Proportion of fusing between samples | 1/2000 | 0/2000 | 0/2000 | 10/2000 |
| Continuity modulus of plating | 100% | 100% | 100% | 98% |

Subsequently, after the baking, the cross sections and surfaces of the first and second external electrodes 14 and 15 were observed with a scanning electron microscope (SEM). As a result, in the Examples 1 to 3, as shown in FIGS. 4 and 5, many rod-like crystal particles were found (rod-like crystal particles: present), and those crystal particles were distributed a lot in the surface region R1 of each of the first and second external electrodes 14 and 15. Meanwhile, in the Comparative example, such crystal particles were not found (rod-like crystal particles: absent).

In order to confirm the composition of the crystal particles observed in the Examples 1 to 3, the surfaces S of the first external electrode 14 and the second external electrode 15 were analyzed by X-ray diffraction (XRD).

Figure 9:
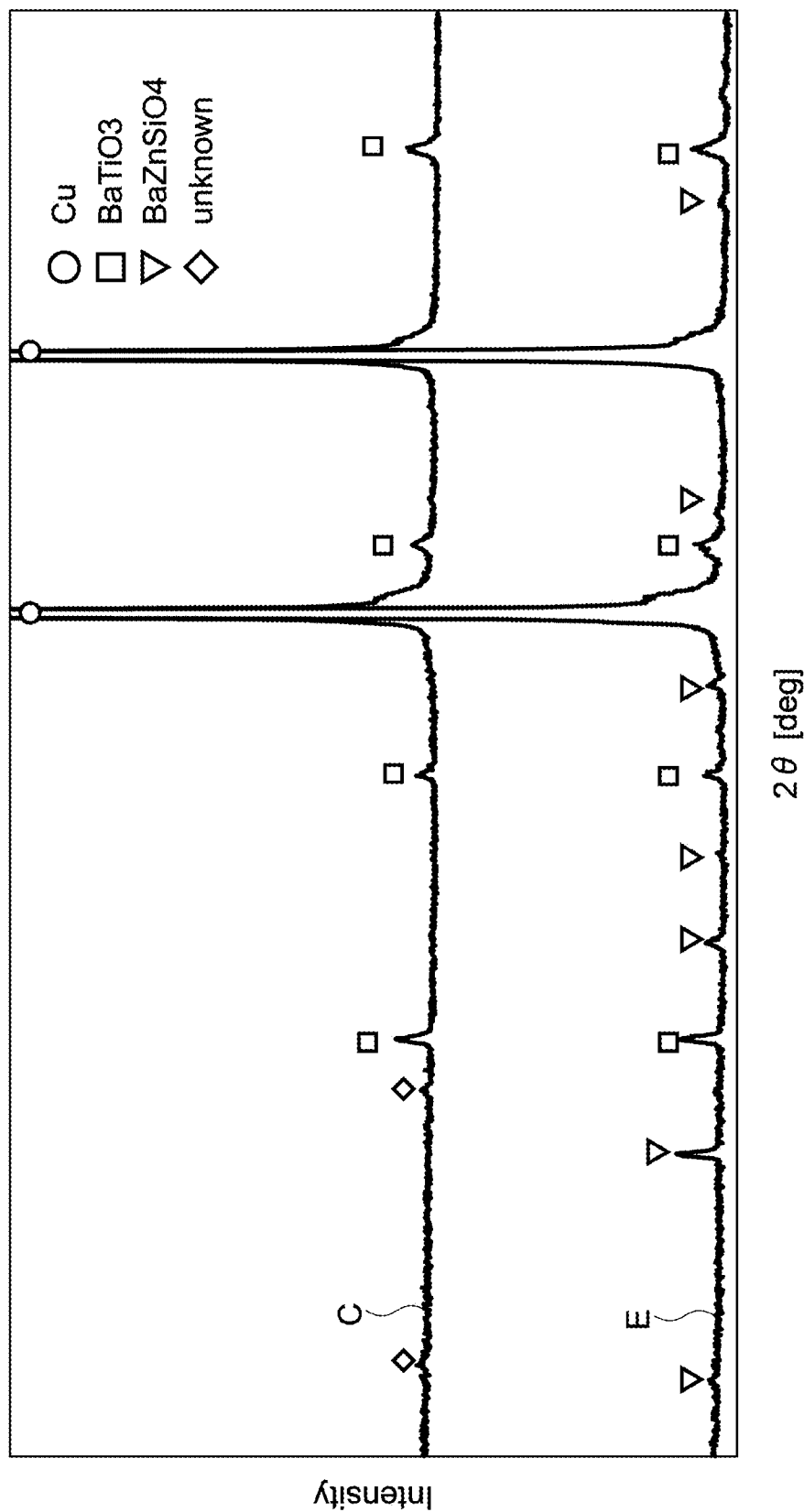
FIG. 9 is a diagram showing results obtained by analyzing the surfaces of external electrodes according to Examples and Comparative example of the present disclosure by X-ray diffraction (XRD).

FIG. 9 shows an example of analysis results. In FIG. 9, results of the Example 2 are denoted by E, and results of the Comparative example are denoted by C. Further, among the symbols given to the peaks, a circle represents copper (Cu), a square represents barium titanate ($BaTiO_3$), and a triangle represents barium zinc silicate ($BaZnSiO_4$).

Although copper (Cu) and barium titanate ($BaTiO_3$) as a component of the ceramic body were detected from the surfaces of the external electrodes of the Comparative example, barium zinc silicate ($BaZnSiO_4$) was not detected therefrom.

Meanwhile, in addition to Cu and $BaTiO_3$, $BaZnSiO_4$ was also detected from the surfaces S of the first external electrode 14 and the second external electrode 15 of the Example 2.

From those results, it was determined that the rod-like crystal particles observed in the Examples 1 to 3 were $BaZnSiO_4$ and also the rod-like crystal particles P of this embodiment.

Further, among the 2,000 samples simultaneously baked, the number of fused samples was counted. As a result, in the Example 1, the number of fused samples was one, and in the Examples 2 and 3, zero. Meanwhile, in the Comparative example, the number of fused samples was ten, which was more than in the Examples 1 to 3. Further, compared between the Examples 1 to 3, the Examples 2 and 3 in which the dew-point temperature is 30° C. or more could reliably suppress the fusing more than the Example 1 in which the dew-point temperature is 26° C.

Furthermore, after the baking, plating films formed of nickel (Ni) were formed on the surfaces S of the first external electrode 14 and the second external electrode 15 by electrolytic plating. As a result, each of the Examples 1 to 3 had a continuity modulus of 100%, whereas the Comparative example had a continuity modulus of 98%, in which non-continuous portions were found.

Form those results described above, it was determined that, by baking of the electrode material containing barium (Ba), zinc (Zn), and silicon (Si) under the humidified atmosphere, the rod-like crystal particles P are deposited, and the fusing between the samples can be inhibited from occurring. Furthermore, in the Examples 1 to 3 of the present disclosure, it was determined that the continuity modulus can be improved also when plating films are formed on the first external electrode 14 and the second external electrode 15.

Hereinabove, the embodiment of the present disclosure has been described, but the present disclosure is not limited to the embodiment described above, and it should be appreciated that the present disclosure may be variously modified without departing from the gist of the present disclosure.

For example, in the multi-layer ceramic capacitor 10, the capacitance forming unit 16 may be divided into a plurality of capacitance forming units 16 and then disposed in the Z-axis direction. In this case, in each capacitance forming unit 16, the first and second internal electrodes 12 and 13 only need to be alternately disposed along the Z-axis direction, and the first internal electrodes 12 or the second internal electrodes 13 may be consecutively disposed at portions where the capacitance forming units 16 are adjacent to each other.

Further, in the embodiment described above, the multi-layer ceramic capacitor has been described as an example of a ceramic electronic component, but the present disclosure can be applied to any other multi-layer ceramic electronic components in which paired internal electrodes are alternately disposed. Examples of such multi-layer ceramic electronic components include a piezoelectric element.

The invention claimed is:

1. A ceramic electronic component, comprising:
   a ceramic body that includes internal electrodes; and
   an external electrode that includes a plurality of rod-like crystal particles containing Ba, Zn, Si, and O, the external electrode being formed on a surface of the ceramic body and connected to the internal electrodes,
   wherein at least some of the plurality of rod-like crystal particles are deposited on the surface of the external electrode, and
   wherein if the external electrode is divided into a surface region within a half depth of a thickness of the external electrode from a surface of the external electrode, and an internal region adjacent between the surface region and the ceramic body, more rod-like crystal particles of the plurality of rod-like crystal particles are present in the surface region than in the internal region.

2. The ceramic electronic component according to claim 1, wherein
   the plurality of rod-like crystal particles are formed of barium zinc silicate ($BaZnSiO_4$).

3. The ceramic electronic component according to claim 1, wherein
   each of the plurality of rod-like crystal particles has a length of 20 μm or less in a longitudinal direction.

4. The ceramic electronic component according to claim 1, wherein
   the external electrode comprises copper.

5. A method of producing a ceramic electronic component, comprising:
   forming a ceramic body including internal electrodes;
   applying an electrode material containing Ba, Zn, and Si and comprising flaky metal powder to a surface of the ceramic body, the flaky metal powder having a length in the longitudinal direction of 5 μm or more and a thickness of 1 μm or less; and
   depositing rod-like crystal particles containing Ba, Zn, Si, and O on a surface by baking the electrode material under a humidified atmosphere, and forming an external electrode that is connected to the internal electrodes.

6. The method of producing a ceramic electronic component according to claim 5, wherein
   an aspect ratio of the length in the longitudinal direction to the thickness of the flaky metal powder is equal to or more than tenfold.

7. The method of producing a ceramic electronic component according to claim 5, wherein
   the electrode material comprises copper.

* * * * *